United States Patent [19]

Huang et al.

[11] Patent Number: 4,747,098
[45] Date of Patent: May 24, 1988

[54] ZERO BYTE ADDRESS LINKED LIST

[75] Inventors: Zheng F. Huang, Ft. Lauderdale; William M. Robbins, Hollywood, both of Fla.

[73] Assignee: Racal Data Communications Inc., Sunrise, Fla.

[21] Appl. No.: 930,178

[22] Filed: Nov. 13, 1986

[51] Int. Cl.⁴ ............................. H04J 3/00; H04J 3/12
[52] U.S. Cl. .................................. 370/99; 370/110.1; 370/100
[58] Field of Search ............... 370/68, 99, 110.1, 68.1, 370/100; 379/65, 93, 94

[56] References Cited

PUBLICATIONS

"Line Code Formats for ISDN Clear Channels: Stand-Alsone vs. Integrated Network Solutions", G. J. Beveridge, S. C. Taylor, S. Gorshe, Jul. 26, 1985.

Primary Examiner—Douglas W. Olms
Assistant Examiner—Frank M. Scutch, III
Attorney, Agent, or Firm—Jerry A. Miller

[57] ABSTRACT

A method of encoding data into a frame, includes the step of providing a frame having a plurality of byte locations for storing a plurality of bytes each associated with one of the byte locations. The value of the initial byte location of the frame is stored in a temporary register. An address of a first byte location having zero value is stored in the initial byte location of the frame. A continuation bit associated with the address of said first byte location is set. The value of the initial byte is stored in the first byte location. The non-zero valued bytes of information are stored in their associated byte locations of the frame. When the initial byte location contains zero, the last location containing an address of a zero valued byte repeats the previous address having a zero valued byte.

4 Claims, 3 Drawing Sheets

| ORIGINAL FRAME | | ZBALL FRAME | | | |
|---|---|---|---|---|---|
| BYTE NO. | DATA BIT 1-8 | BYTE NO. | CONT. BIT (BIT 1) | BITS 2-8 | FLAG BIT |
| 0 | 0 | 0 | 1 | 5 | 1 |
| 1-4 | DATA | 1-4 | DATA | | |
| 5 | 0 | 5 | 1 | 16 | |
| 6-15 | DATA | 6-15 | DATA | | |
| 16 | 0 | 16 | 1 | 24 | |
| 17-23 | DATA | 17-23 | DATA | | |
| 24 | 0 | 24 | 1 | 29 | |
| 25-28 | DATA | 25-28 | DATA | | |
| 29 | 0 | 29 | 1 | 29 | |
| 30-127 | DATA | 30-127 | DATA | | |

Fig. 1

| ORIGINAL FRAME | | ZBALL FRAME | | | |
|---|---|---|---|---|---|
| BYTE NO. | DATA BIT 1-8 | BYTE NO. | CONT. BIT (BIT 1) | BITS 2-8 | FLAG BIT |
| 0-7 | DATA | 0 | 1 | 8 | 1 |
| 8 | 0 | 1-7 | DATA | | |
| 9 | DATA | 8 | 1 | 10 | |
| 10 | 0 | 9 | DATA | | |
| 11-18 | DATA | 10 | 1 | 19 | |
| 19 | 0 | 11-18 | DATA | | |
| 20-26 | DATA | 19 | 0 | 27 | |
| 27 | 0 | 20-26 | DATA | | |
| 28-127 | DATA | 27 | DATA FROM BYTE 0 | | |
| | | 28-127 | DATA | | |

Fig. 2

| ORIGINAL FRAME | | ZBALL FRAME | | | |
|---|---|---|---|---|---|
| BYTE NO. | DATA BIT 1-8 | BYTE NO. | CONT. BIT (BIT 1) | BITS 2-8 | FLAG BIT |
| 0 | 0 | 0 | 1 | 5 | 1 |
| 1-4 | DATA | 1-4 | DATA | | |
| 5 | 0 | 5 | 1 | 16 | |
| 6-15 | DATA | 6-15 | DATA | | |
| 16 | 0 | 16 | 1 | 24 | |
| 17-23 | DATA | 17-23 | DATA | | |
| 24 | 0 | 24 | 1 | 29 | |
| 25-28 | DATA | 25-28 | DATA | | |
| 29 | 0 | 29 | 1 | 29 | |
| 30-127 | DATA | 30-127 | DATA | | |

`4,747,098`

ZERO BYTE ADDRESS LINKED LIST

BACKGROUND OF THE INVENTION

1. Field of the Invention

This invention relates generally to the field of digital communications. More particularly, this invention relates to the field of digital communications having requirements for derivation of synchronization from the digital signal and the problems associated with maintaining synchronization in such a system during period of long strings of zeros or low ones density.

2. Background

To meet CCITT Recommendation G.703, (and Bell Publication 62411), T1 communication devices are required to send no more than 15 consecutive zeros in their data stream and must have a minimum ones pulse density of 12.5%. This requirement allows the telephone company's equipment to maintain synchronization. Long strings of consecutive zeros can cause many problems. For example, such long strings of zeros can cause T1 repeater equipment to lose synchronization. A scheme for limiting the length of strings of consecutive zeros is therefore necessary for present digital networks. Among the most important factors in a zero limitation scheme are the use of a minimum of bandwidth as overhead, and keeping the hardware and/or software implementation simple.

In today's networks, 1 out of 8 bit stealing is a method in use that prevents the transmitting of more than 15 consecutive zeros in a data stream. This method is performed simply by setting 1 bit out of every byte, thereby using one-eighth of the users bandwidth. It is the among the simplest available schemes for consecutive zero limitation, but the high overhead seriously impacts data throughput making it undesirable.

Another method of zero limitation involves detecting 15 consecutive zeros, and when there are 15 consecutive zeros the next bit must always be set. Some of the users bandwidth can be reserved to hold the actual 16th bit when this happens. The number of bits reserved for this purpose will give the number of occurrences of 15 consecutive zeros that can be handled without causing a bit error. Errors may still occur using this method if the overhead is less than 6.25%. To apply this method, scramblers, parallel to serial converters, and serial to parallel converters are needed to guarantee a ones density of at least 12.5%.

In September 1981, AT&T announced a method termed Bipolar Eight Zero Substitutions (B8ZS) which provides a clear channel for the primary rate. B8ZS inserts deliberate bipolar violations to permit transmission of zero bytes while providing sufficient pulse density For the repeater equipment and T1 source/sink devices.

ZBTSI, which stands For Zero Byte Time Slot Interchange, is an alternate solution to the problem. It appeared in a contribution to the CCITT standards committee T1X1.4 as a candidate to become a standard. It requires only a small amount of overhead (1 bit For a 127 byte frame), and it requires a smaller investment, from a network viewpoint, than B8ZS. A detailed comparison of ZBTSI and B8ZS is found in G. J. Beveridge et al, "Line Code Formats for ISDN Clear Channels: Stand Alone vs. Integrated Network Solutions", Document No. T1X1.4/85 CB, July 26, 1985.

The present invention, termed the Zero Byte Address Linked List method (ZBALL) is a modification of ZBTSI, that has the same advantages of ZBTSI over B8ZS. ZBALL makes some improvements over ZBTSI in the following respects. ZBALL can use the full 128 addresses available in a byte-wide system, ZBTSI can have a maximum of only 127 bytes per frame. In some cases, For example X.25, a 128 byte (1024 bit) packet size becomes important. ZBTSI may be much more difficult than the present invention to implement in hardware since it involves shifting the location of the bytes in a frame. There is no shifting of bytes in ZBALL, just replacement of the byte's contents.

SUMMARY OF THE INVENTION

The present invention solves the above problems by creating a "frame", and then sending the address of byte locations where zeros occur in the frame, instead of the zeros themselves. The address of the first zero byte is placed in the first byte of the frame. The address of the second zero byte is placed in the first zero byte. The address of the next zero byte is placed in the previous zero byte, and so on, until the end of the frame is reached. Once all of the zero bytes are found, the first byte is put into the last zero byte. One bit is reserved in each zero byte to signify if further addresses exist, giving 128 bytes as the maximum frame size. One flag bit is needed to signify that at least one zero byte is in the frame.

Some of the main advantages to this scheme are that only a minimum of overhead is needed, it will not cause any bit errors for any input data, and it will be comparable, if not easier to implement, than other schemes. Also, the new method can provide 128 byte frames, (1024 bits per frame), whereas, ZBTSI can only provide 127 bytes per frame. And, since there is no byte shifting involved, the present invention is easier to implement than ZBTSI. This is especially true when the system is required to operate at high data rates.

Accordingly, it is an object of the present invention to provide an improved method of providing a clear channel in digital communication equipment.

It is another object of the present invention to provide an improved method of providing clear channel which allows transmission of a 128 byte frame.

It is another object of the present invention to provide an improved method of providing clear channel which is simple to implement.

These and other objects and advantages of the invention will become apparent to those skilled in the art upon consideration of the following description.

In one embodiment of the present invention, an improved method of encoding data into a frame, includes the step of providing a frame having a plurality of byte locations for storing a plurality of bytes each associated with one of the byte locations. The value of the initial byte location of the frame is stored in a temporary register. An address of a first byte location having zero value (excluding the initial byte) is stored in the initial byte location of the frame. A continuation bit associated with the address of said first byte location is set. The value of the initial byte is stored in the first byte location. The non-zero valued bytes of information are stored in their associated byte locations of the frame.

The features of the invention believed to be novel are set forth with particularity in the appended claims. The invention itself, however, both as to organization and method of operation, together with further objects and advantages thereof, may be best understood by reference to the following description taken in conjunction with the accompanying drawings.

DESCRIPTION OF THE DRAWINGS

FIG. 1 illustrates an example of how a ZBALL frame is encoded.

FIG. 2 illustrates an example of how a ZBALL frame is encoded when a zero appears as the first word in the frame.

DESCRIPTION OF THE INVENTION

Figure 3:
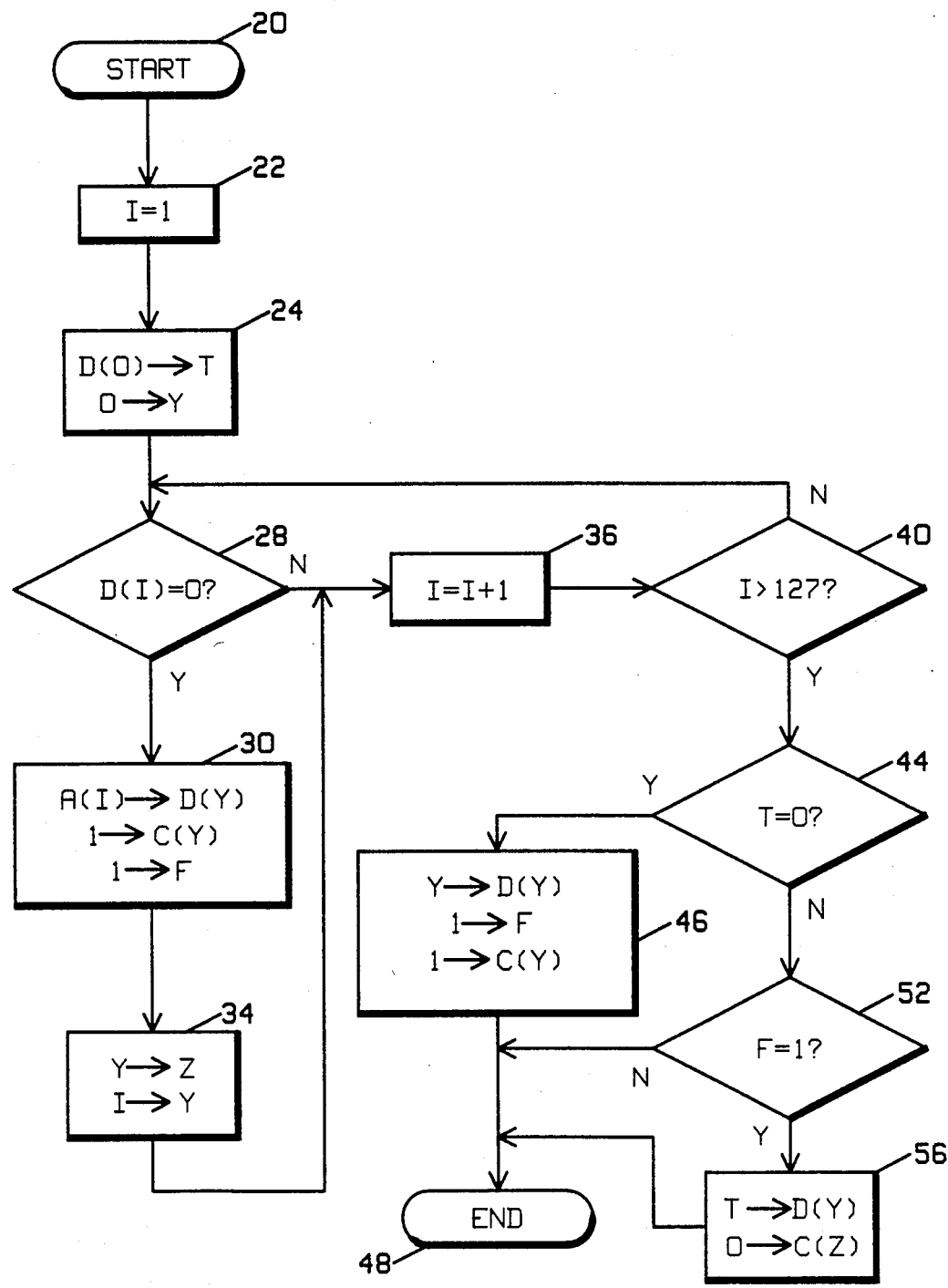
FIG. 3 is a flow chart of the ZBALL encoding process.

In order to facilitate description of the present invention, the ZBALL encoding process will be explained in terms of examples using a 128 byte frame. However, it should be clearly understood that ZBALL will operate on nibbles, bytes, words or any n-bit wide system (for $n > 2$) that requires a limitation on the number of consecutive zeros it can transmit. For purposes of this discussion, the terms 'byte' and 'word' should be liberally interpreted to include nibbles, words, groups of words, groups of nibbles or groups of bits as any of the above may be utilized in practicing the present invention according to the requirements of the particular system. For purposes of this discussion, 'byte' and 'word' are not to be limited in meaning to the conventionally accepted definition of an eight (or sixteen or thirty-two, etc) bit binary word. The specific embodiment disclosed as an example will guarantee that no more than 15 consecutive zeros will be transmitted and there are at least 12.5% ones. This conforms to the requirements of a T1 link. Those skilled in the art will appreciate that the present invention may be suitably modified to meet other requirements.

In ZBALL an address is sent in the place of an n-bit wide zero string occurring in a "frame" of some number of n-bit wide words, instead of the word itself. Each n-bit address of a zero word reserves a "continuation" bit to signify that another n-bit address of a zero word remains, thus giving $2^{(n-1)}$ usable addresses in an n-bit wide system. The maximum number of bits that can be processed at one time by ZBALL for an n-bit wide system is:

MAX BITS = $2^{(n-1)} \times n$

In a one byte wide system with 8 bits per byte, the maximum number of bits that can be processed at a time is:

MAX BITS = $2^{(8-1)} \times 8 = 1024$ bits and the maximum frame size (#of addresses) for a one byte-wide system is:

MAX FRAME = $2^{(8-1)} = 128$, bytes

A flag bit is used to signify that the ZBALL operation has been performed on a frame. This flag bit is all the overhead that is needed to perform ZBALL. A bit may be reserved in the packet header for this purpose. Other systems could either reserve a bit, or for instance, in T1 systems, the framing bit may be utilized as in ZBTSI. In an eight bit wide system with a maximum frame size of 128 bytes, only 7 bits are required to uniquely define each byte address, therefore, an eighth bit may be used as a continuation bit.

The ZBALL process is explained below using as an example a byte-wide system.

ZBALL ENCODING PROCEDURE

The ZBALL frame starts from byte location zero (the initial byte in the frame). The frame may be up to 128 bytes in length, starting with byte 0, and ending with byte 127. A flag bit signifies whether or not the frame includes any zero bytes. This flag bit may be part of the user's frame or may be sent separately, for example as in ZBTSI. The first step after determining that a flag bit is present, is to store the data of byte 0 in a temporary register. The next step in the process is to search for zero bytes, starting with byte 1 of the frame. After the first zero byte is found, the address of the first zero byte is put into byte zero. The search for zero bytes continues. The address of each zero byte input into the previous zero byte, and the continuation bit is set in the previous zero byte. This process continues until the last zero byte has been found and the end of the frame is reached.

The contents of byte 0, which is in the temporary register, is then placed into the last zero byte. The previous continuation bit remains cleared. A flag is set to show this frame had at least one zero byte. During the entire encoding procedure, all non-zero bytes, except for byte 0 are unaffected. If there were no zero bytes in the frame, the frame is unchanged, and the flag bit remains cleared.

In practice, those skilled in the art will recognize that the process may be more efficiently done by initially setting all continuation bits and later clearing the last one. However, the explanation is simplified by describing the process as above. Either technique is acceptable and equivalent.

EXAMPLE 1

Referring now to FIG. 1, an example of ZBALL encoding is shown. For this example, assume a frame size of 128 bytes has been selected, and that a particular frame contains zero valued bytes in byte number 8, 10, 19 and 27. The ZBALL encoding operation would be as follows:

(1) The contents of byte 0 is stored in "R" (a temporary register).

(2) The address of the first zero byte 8, is stored in byte 0.

(3) Ten is stored in byte 8, and the continuation bit is set byte 0.

(4) 19 is stored in byte 10, and the continuation bit is set in byte 8.

(5) 27 is stored in byte 19, and the continuation bit is set in byte 10.

(6) The "R" register is loaded into byte 27. The continuation bit of byte 19 is not set.

(7) None of the other bytes are affected. The flag is set to show that this frame has at least one zero byte.

It should be noted, as is evident from the FIG. that each byte may contain either 8 bits of data or a 7 bit address plus 1 continuation bit after ZBALL encoding. As previously explained, it is more efficient to actually set all continuation buts and then clear the last one.

If byte 0 is a zero byte, then the frame is treated as a special case. In this case, the last continuation bit is set, and the last zero byte address is placed in the last zero byte. This repetition of the last zero byte address will signify that the special case has occurred.

EXAMPLE 2

ZERO IN FIRST BYTE

Turning now to FIG. 2, an example of ZBALL is shown in which the first byte contains all zeros. Again assume a frame size of 128 bytes has been selected, and that a particular frame contains zero bytes in positions 0, 5, 16, 24 and 29. The ZBALL encoding operation would be as follows:

(1) The contents of byte 0 (all zeros) is stored in "R".
(2) The address of the first zero byte (starting from byte 1), 5, is stored in byte 0.
(3) 16 is stored in byte 5, and the continuation bit is set in byte 0.
(4) 24 is stored in byte 16, and the continuation bit is set in byte 5.
(5) 29 is stored in byte 24, and the continuation bit is set in byte 16.
(6) 29 is also stored in byte 29, and the continuation bit is set in byte 24.
(7) The continuation bit of byte 29 is set. (The reason For this will be explained later). The flag bit is also set.

There is also a very special case that can occur. Byte zero could be the only zero byte of the entire frame. In this case, the final ZBALL result is that the flag bit is set, and byte zero is sent as [1,0000000]. It is for this reason that if byte 0 is a zero byte, the final continuation bit must always be set according to the preferred embodiment. This avoids sending a zero byte, if byte 0 was the only zero byte of the frame. There are no other effects on the original frame. This is the reason that in the above example the continuation bit of byte 29 was set.

A complete flow chart to implement the encoding procedure for a 128 byte frame is shown in FIG. 3. Those skilled in the art will readily appreciate that this process is readily modified to accommodate other size frames. In this flow chart, the following variables are used:

I = pointer or index for word locations in a frame of data words.
D(I) = the data content of the Ith word in the frame
T,Y,Z = temporary storage registers.
A(I) = address of Ith data word.
C(I) = continuation bit for Ith address.
F = flag bit for frame indicating that at least one zero word is present in the frame.

Turning now to FIG. 3, the process begins at step 20 after which I is initialized to 1 at step 22. At step 24, the contents of the first data location D(0) is loaded into the T register and 0 is loaded into the Y register. Control then passes to decision block 28 where the data at the ith location D(I) is compared with zero. If D(I)=0 then control passes to 30 where the address of the Ith word A(I) is loaded into data location D(Y); I is loaded into C(Y) (that is the continuation bit is set); and 1 is loaded into F (the flag which indicates that the frame contains at least one zero is set).

Next, control passes to step 34 where the previous zero address location Y is loaded into the Z register and the current zero address I is loaded into the Y register. Control then passes to step 36. In the event D(I) is not zero at step 28, control passes directly to step 36 bypassing steps 30 and 34. At step 36, the counter I is incremented by 1 and control passes to step 40. At step 40 the value of I is compared to 127. If I > 127 then control passes to step 44 else control passes back to step 28.

At step 44, the T register is checked to see if it contains zero indicating that the first byte was equal to zero. If so, control passes to step 46 where the contents of the Y register is loaded into D(Y); 1 is loaded into F (the flag is set) and C(Y) is loaded with 1 (the continuation bit is set). The routine terminates for the current frame at step 48 after step 46.

If the T register does not contain zero at step 44, control passes to step 52 where the flag is inspected. If the flag is not set, control passes to step 48 and the routine terminates. If the flag is set, control passes to step 56 where T is loaded into D(Y) (the first byte of data is loaded into the last zero valued byte position) and zero is loaded to C(Z) (no continuation bit).

When no zeros are found, this routine executes loop 28-36-40-28. When a zero is found, it is processed in loop 28-30-34-36-40-28.

The above routine illustrates the ease of implementing the encoding process. No shifting of data is required and only 3 one word registers plus the memory for the frame are needed to implement it. Of course those skilled in the art will appreciate that other techniques may exist to implement the present invention and the present invention as shown in FIG. 3 may take on various embodiments. For example, both hardware and software (firmware) embodiments may be implemented using the flow chart of FIG. 3. In hardware embodiments, the reassignments shown in steps 24, 30, 34, 46 and 56 may be executed in parallel while software embodiments will likely implement these reassignments in series.

ZBALL DECODING PROCEDURE

In order to decode a frame, first the flag bit must be checked. If the flag is cleared the frame is passed through unchanged, but if it is set, the frame must be decoded. The following procedure will locate the zero bytes. The address of the first zero byte can be found in byte 0. The address of the next zero byte will be found in the previous zero byte. The procedure will terminate in two cases. The first case is when the continuation bit is cleared, in this case the data of the last zero byte is placed in byte 0. The second case is when the continuation bit is set, but the address of the next zero byte is equal to the current address. In this case, byte zero is made all zeros.

Figure 4:
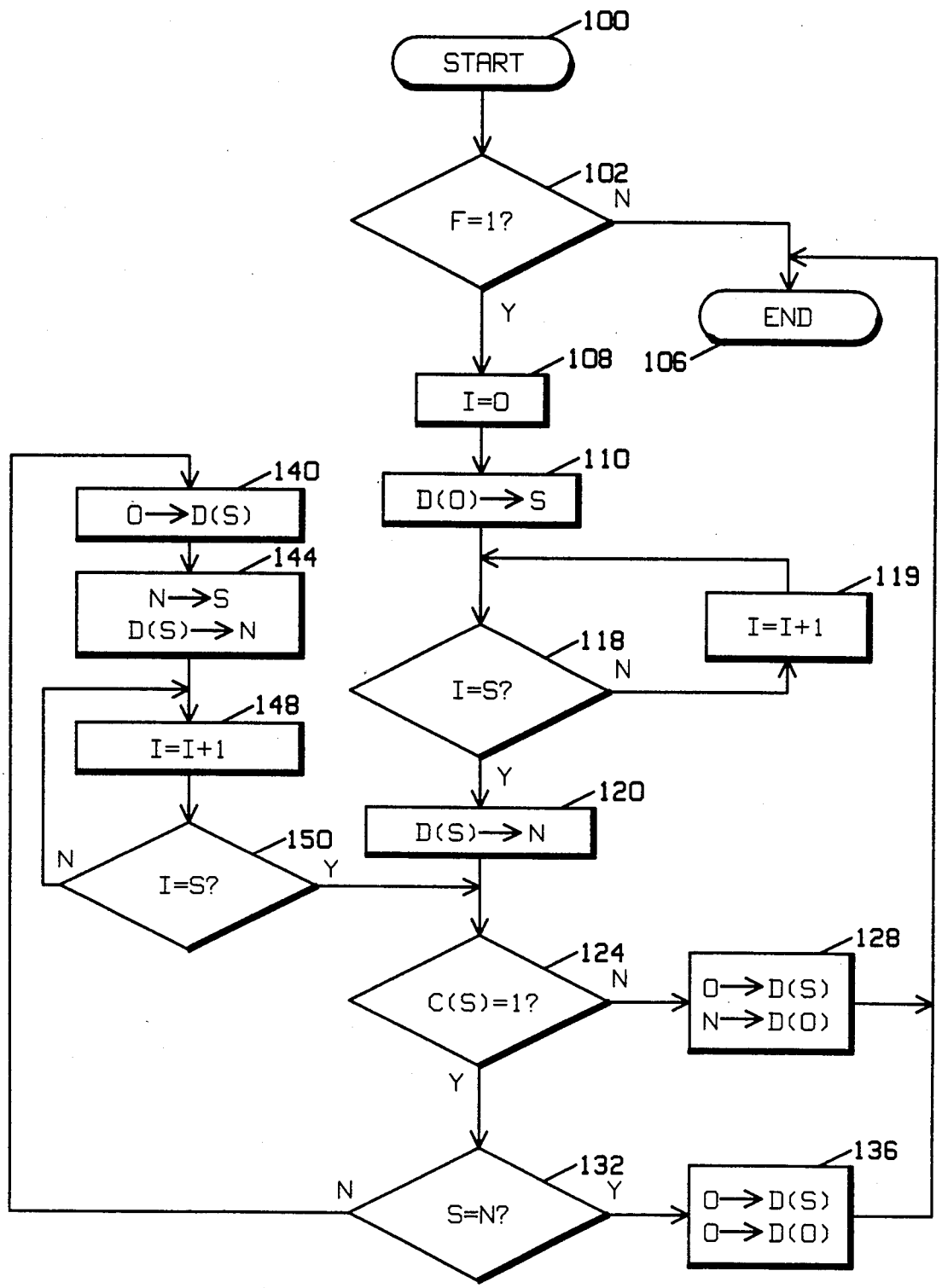
FIG. 4 is a flow chart of the ZBALL decoding process.

A complete flow chart to implement the decoding procedure is shown in FIG. 4. This flow chart additionally uses the following notation:

S, N = temporary storage registers.

It should be noted that the S register has a bit location reserved for a continuation bit and 7 bit locations for address information.

Turning now to FIG. 4, the decoding routine is entered at step 100. At step 102, the frame flag F is inspected. If the flag F is not set, the routine terminates at 106 indicating that no zeros were present in the frame. Else, control passes to step 108 where I is initialized to 0. Control then passes to step 110 where the contents of D(0) is loaded into the temporary register S. Control then passes to decision block 118 where I is inspected to determine if it is equal to S (the address of the first zero valued byte). If not, control passes to step 119 where I is incremented by 1 and then back to step 118. The counter is repeatedly incremented in this manner until I>S in 118. At this point, the value of D(S) is loaded into the N register at step 120.

Control then passes from 120 to 124 where the continuation bit is inspected. If the continue bit C(I) is not set (equal to 0), indicating that no more zeros are present in the frame, control passes to step 128 where 0 is loaded into D(S) and N is loaded into D(0). The routine then terminates at 106.

If the continuation bit is set at step 124, control passes to step 132 where S is compared to N to determine if the last zero byte has been processed (S=N). If so, control passes to step 138 where 0 is loaded into D(S) and 0 is loaded into D(0). The routine then terminates at step 106.

If S is not equal to N at step 132, control passes to step 140 where 0 is loaded into D(S) and control passes to step 144. At 144, N is loaded into S and B(S) is loaded into N. Control then passes to step 148 where I is incremented. Control is passed to step 150 where I is compared with S. If I is not equal to S then control passes back to 148 where I is repeatedly incremented until I=S. When I=S the process goes back to step 124. The loop 124–132–140–144–148–150–124 represents the process of processing more zero valued bytes. Remarks similar to those regarding variations of FIG. 3 are similarly applicable to FIG. 4.

The present invention may implemented by use of a programmed processor such as a microcomputer programmed according to the flow charts of FIG. 3 and FIG. 4, but this is not to be limiting as those skilled in the art will appreciate that hard wired logic circuit equivalents may be developed which also operate according to those flow charts. Such hard wired logic equivalents may have advantages over a programmed general purpose processor implementation of the present invention in some instances. For example, circuit size and cost may be lower in large volumes when the circuitry is implemented as a custom or semi-custom integrated circuit. Reliability may be similarly enhanced due to reduced part count for such hard wired implementations.

ZBALL can provide a viable alternative to both ZBTSI and B8ZS as a standard line code format which supports clear channel capacity. ZBALL also meets end-user requirements to transmit unrestricted data through a network not capable of handling the bipolar violations required by B8ZS. Those skilled in the art will recognize that the above examples are intended only to be illustrative of the present invention. The invention itself, however, may take on many alternatives and variations as will occur to those skilled in the art.

Thus it is apparent that in accordance with the present invention, a method that fully satisfies the aims, advantages and objectives is set forth above. While the invention has been described in conjunction with with specific embodiments, it is evident that many alternatives, modifications and variations will become apparent to those skilled in the art upon consideration of the forgoing description. Accordingly, it is intended that the present invention embrace all such alternatives, modifications and variations as fall within the spirit and broad scope of the appended claims.

What is claimed is:

1. A method of encoding data into a frame, comprising the steps of:
    providing a frame having a plurality of byte locations for storing a plurality of bytes each associated with one of said byte locations;
    storing the value of the initial byte location of said frame in a temporary register;
    searching all byte locations of said frame after said initial byte location for a first byte location containing zero;
    storing an address of a first byte location containing zero in said initial byte location of said frame;
    storing the value of said initial byte stored in said temporary register in said first byte location; and
    storing non-zero valued bytes of information in their associated byte locations of said frame.

2. A method of encoding data into a frame, comprising the steps of:
    providing a frame having a plurality of byte locations for storing a plurality of bytes each associated with one of said byte locations;
    storing the value of the initial byte location of said frame in a temporary register;
    searchign said frame for byte locations containing zero;
    storing an address of a first byte location having zero value in said initial byte location of said frame;
    storing the address of each subsequent zero valued byte in a previous zero valued byte location;
    setting a continuation bit associated with each address of said zero valued bytes except a last of said zero valued byte locations;
    storing the value of said initial byte in said last of said zero valued byte locations; and
    storing non-zero valued bytes of information in their associated byte locations of said frame.

3. A method of encoding data into a frame, comprising the steps of:
    providing a frame having a plurality of byte locations for storing a plurality of bytes each associated with one of said byte locations;
    searching said frame for byte locations containing zero;
    finding a zero valued byte in an initial byte location of said frame;
    storing an address of a first byte location having zero value in said initial byte location of said frame;
    storing the address of each subsequent zero valued byte in a previous zero valued byte location;
    setting a continuation bit associated with each address of said zero valued bytes except a last of said zero valued byte locations;
    storing the address of said last zero valued byte in said last of said zero valued byte locations; and
    storing non-zero valued bytes of information in their associated byte locations of said frame.

4. A method of decoding a frame of data, comprising the steps of:
    storing a first address of a first zero valued byte in a first register;
    storing information found at said first address in a second register;
    repeatedly performing the following steps (a) through (d) of:
    (a) inspecting a continuation bit;
    (b) storing information from said address location stored in said first register into said second register;
    (c) storing a zero in the address location stored in said first register;
    (d) copying the contents of said second register to said first register;
    until a continuation bit is not set; and
    storing the information from said second register in an initial byte.

* * * * *